No. 11,890. Reissued Feb. 19, 1901.

C. E. BLUE & W. B. JONES.

MACHINE FOR THE MANUFACTURE OF NARROW NECK BOTTLES.

(Application filed Sept. 25, 1900.)

4 Sheets—Sheet 1.

Witnesses

Geo. E. Frech,

Chas. R. Wright Jr.

Inventors,

W. B. Jones,

C. E. Blue,

By A. S. Pattison Attorney

No. 11,890. Reissued Feb. 19, 1901.

C. E. BLUE & W. B. JONES.

MACHINE FOR THE MANUFACTURE OF NARROW NECK BOTTLES.

(Application filed Sept. 25, 1900.)

4 Sheets—Sheet 2.

No. 11,890. Reissued Feb. 19, 1901.

C. E. BLUE & W. B. JONES.

MACHINE FOR THE MANUFACTURE OF NARROW NECK BOTTLES.

(Application filed Sept. 25, 1900.)

4 Sheets—Sheet 3.

Witnesses
Geo. E. Frech.
Chas. R. Wright Jr.

Inventors.
W. B. Jones,
C. E. Blue,
By A. S. Pattison Attorney

No. 11,890. Reissued Feb. 19, 1901.

C. E. BLUE & W. B. JONES.

MACHINE FOR THE MANUFACTURE OF NARROW NECK BOTTLES.

(Application filed Sept. 25, 1900.)

4 Sheets—Sheet 4.

Witnesses

Geo. E. Frech.

Chas. R. Wright Jr.

Inventors

W. B. Jones,

C. E. Blue,

By A. S. Pattison Attorney

UNITED STATES PATENT OFFICE.

CHARLES E. BLUE AND WILLIAM B. JONES, OF WHEELING, WEST VIRGINIA.

MACHINE FOR THE MANUFACTURE OF NARROW-NECK BOTTLES.

SPECIFICATION forming part of Reissued Letters Patent No. 11,890, dated February 19, 1901.

Original No. 650,722, dated May 29, 1900. Application for reissue filed September 25, 1900. Serial No. 31,117.

*To all whom it may concern:*

Be it known that we, CHARLES E. BLUE and WILLIAM B. JONES, citizens of the United States, residing at Wheeling, in the county of Ohio and State of West Virginia, have invented new and useful Improvements in Machines for the Manufacture of Narrow-Neck Bottles, of which the following is a specification.

Our invention relates to improvements in machines for the manufacture of narrow-neck bottles, and pertains to a machine constructed and adapted to produce a pressed blank, which is afterward blown into its finished form.

Figure 1:
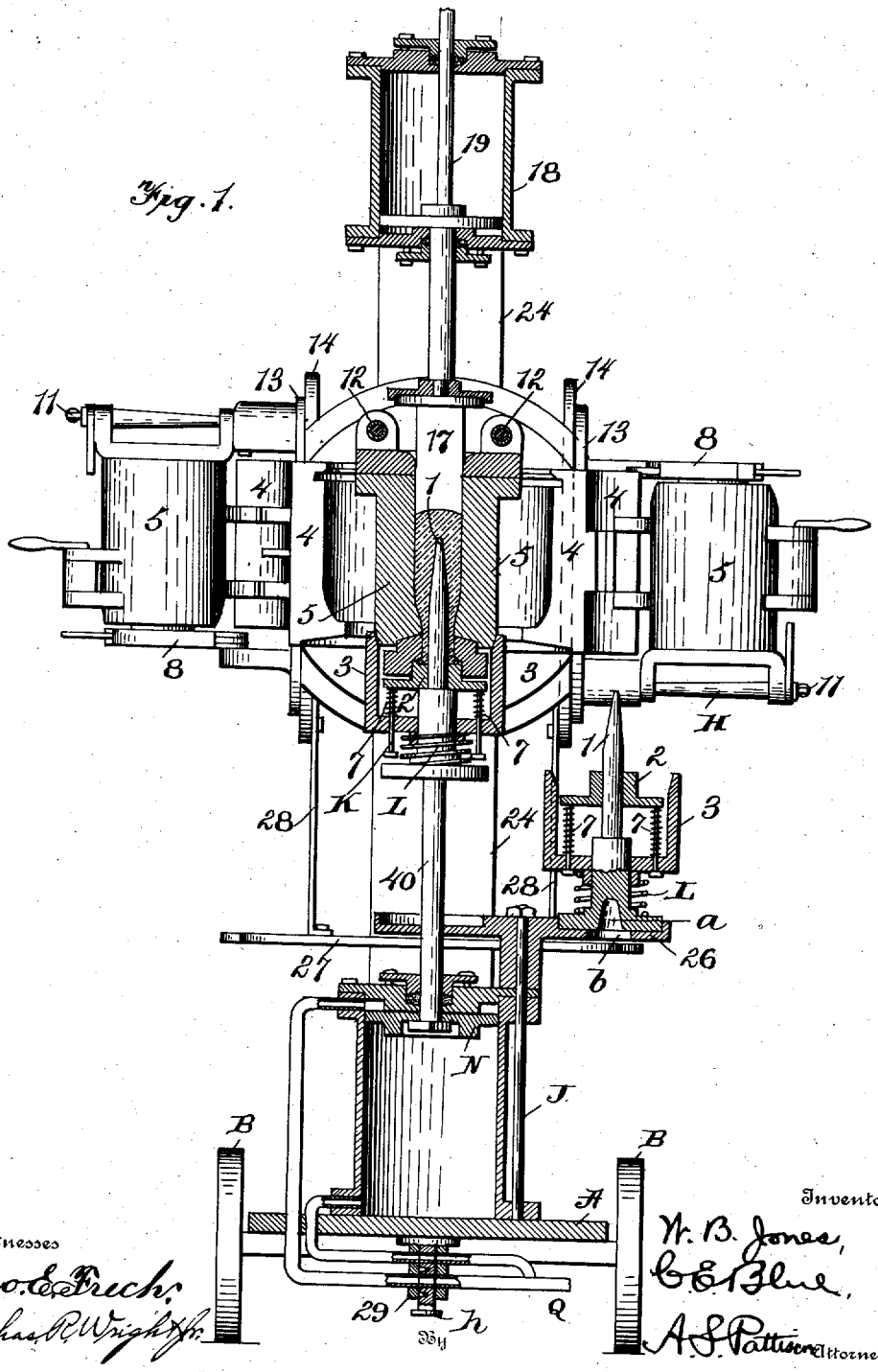
Figure 2:
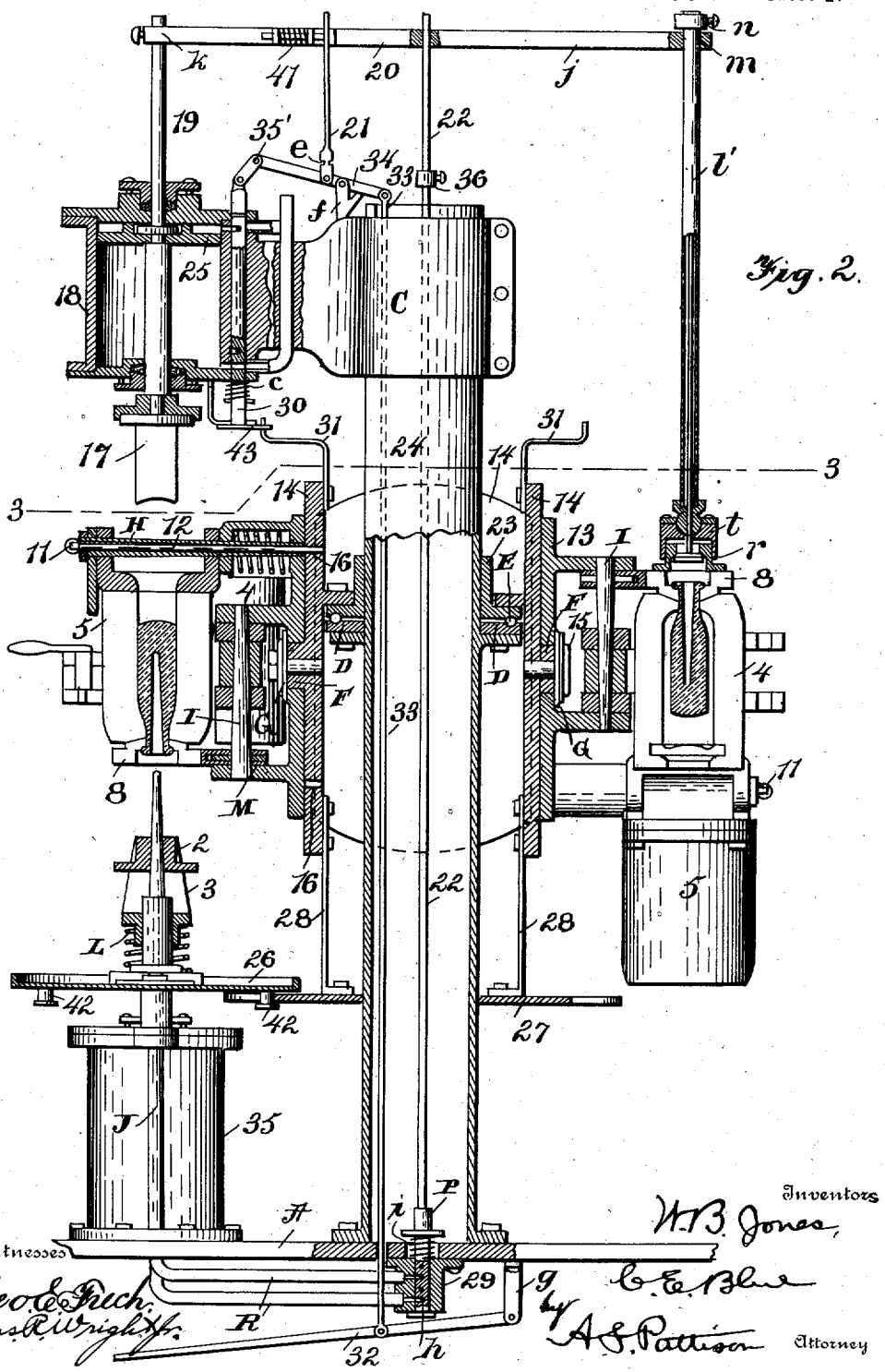
Figure 3:
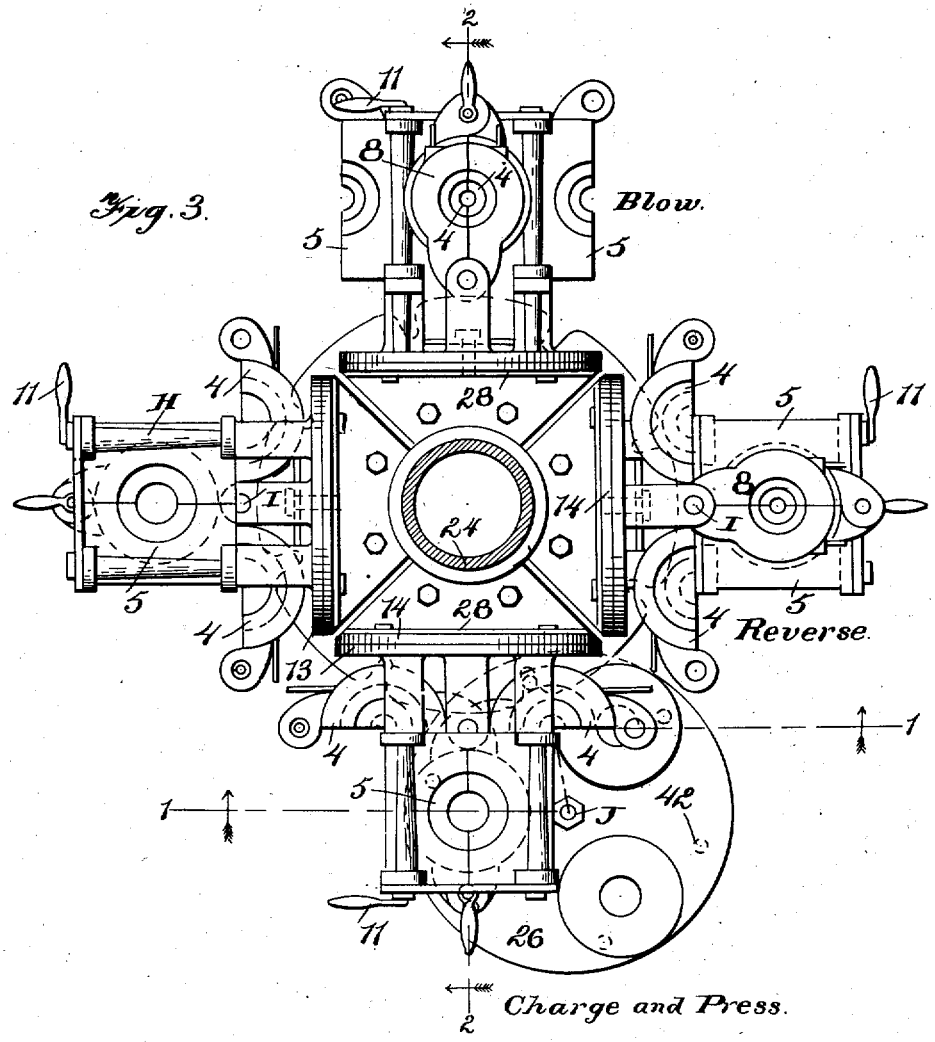
Figure 7:
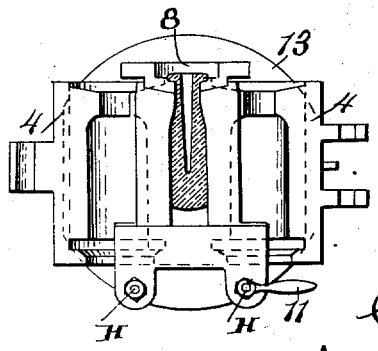
Figure 4:
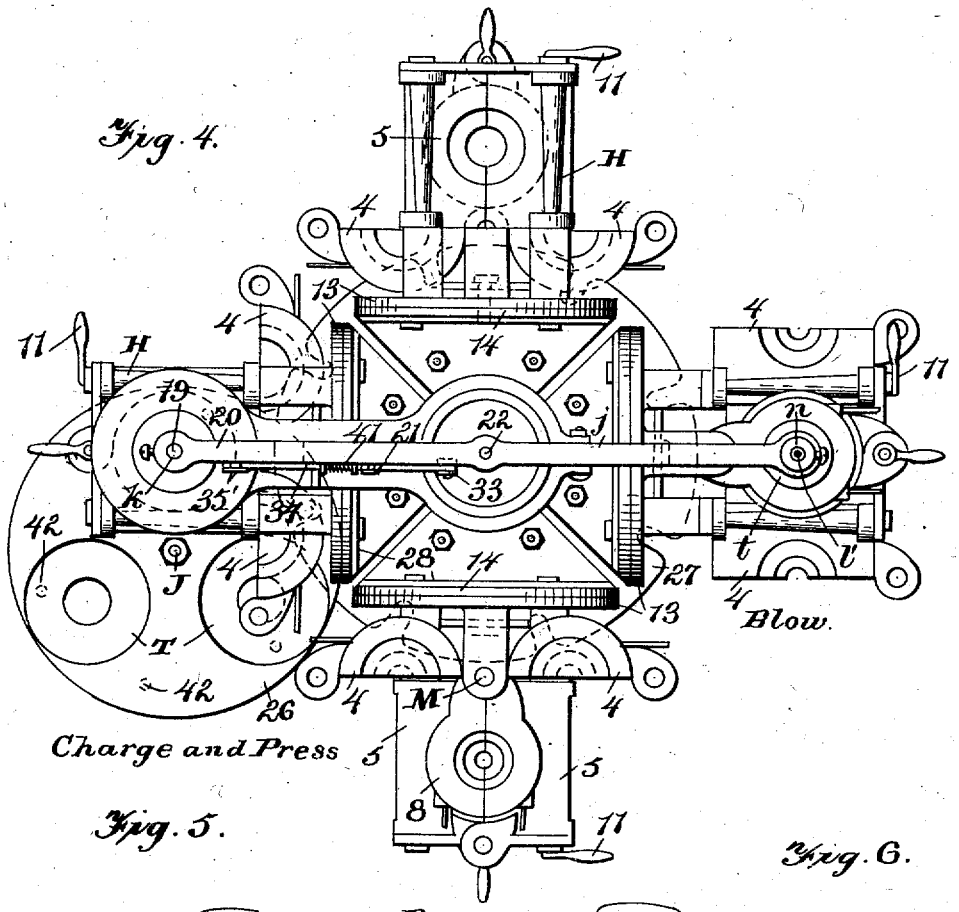
Figure 5:
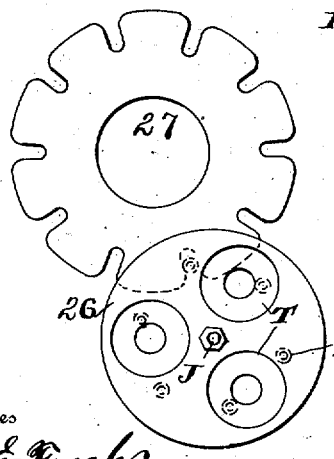
Figure 6:
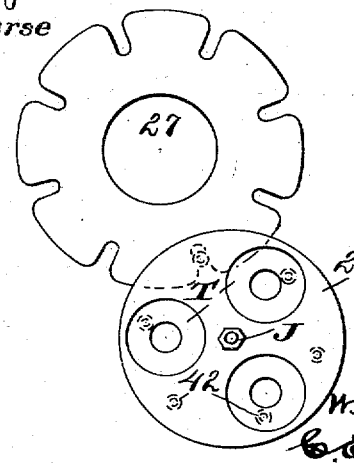

In the accompanying drawings, Figure 1 is a vertical sectional view taken on the line 1 1 of Fig. 3. Fig. 2 is a vertical sectional view taken on the line 2 2 of Fig. 3. Fig. 3 is a top sectional view taken on the line 3 3 of Fig. 2. Fig. 4 is a top plan view of the machine embodying our invention, one set of the molds being omitted. Fig. 5 is an enlarged detached plan view of the plunger-support and the gear-wheel with sufficient number of teeth to have the plunger-support cooperate with five sets of molds instead of with four, as illustrated in Fig. 4. Fig. 6 is a similar view to Fig. 5, showing the gear-wheel with a proper number of teeth to revolve the plunger-support in unison and to coöperate with four sets of molds, as shown in Fig. 4. Fig. 7 is a detached view of the molds and their supporting table or plate, one-half of the press-mold being removed and the parts of the blow-molds shown open.

Referring now to the drawings, A indicates a base supported, preferably, upon the wheels B, by means of which the base, and consequently the machine carried thereby, can be moved around as desired. Projecting from this base is a column or standard 24, carrying at its upper end a bracket or arm C, which supports at its outer end a cylinder 18. Surrounding this column or standard 24 at a point intermediate its ends is a table or bearing 23, to which is supported a plurality of base-plates 14 in any desired manner. This table 23 is supported by a ring D, carried by the column 24, there preferably being a ball-bearing E between the table or collar 23 and the supporting-ring D.

Each of the plates 14 is provided with an outwardly-projecting boss F, which forms a bearing for a rotating mold-supporting table 13, the said table being held upon the said boss or projection F by means of a washer G and a screw 15, as illustrated in Fig. 2. Supported by each of these tables 13 is a press-mold 5, composed of two parts, as clearly shown, and each part having a separate pivotal support at the point H, the said two-part press-mold adapted to open outward or vertically, as will be readily understood from the drawings. Each of these tables 13 also supports a two-part blow-mold 4, which is horizontally pivoted at the point I and adapted to open outward, as illustrated in Fig. 3. When the blow-mold is open, it is entirely out of the way of the two-part press-mold, and when the press-mold is open it is entirely out of the way of the blow-mold, as is also clearly illustrated. These tables 13 are vertically rotatable and each is provided with a spring-actuated locking pin or rod 12, carrying at its outer end a handle 11, the inner end of the pin adapted to engage the openings 16 in the plates 14, whereby the press and blow molds may be supported with their mouths downward, as illustrated in Figs. 1 and 2, or in the reversed position, with their mouths upward, as illustrated in Fig. 5, and the said locking-pin 12 is adapted to hold the rotating tables 13 in these two positions.

Passing through the cylinder 18 is a piston-rod 19, carrying a piston-head 25, both ends of the rod extending through the piston-head, the lower end carrying a bottom 17 for the press-molds 5, the said bottom adapted to move within the press-mold when it is closed, as shown in Fig. 1, the said press-mold having otherwise an open bottom.

Projecting upward from the base A is a standard J, carrying at its upper end a table 26, the said table adapted to rotate upon the upper end of the standard and carrying a plurality of plungers 1. Surrounding the lower ends of these plungers are the collars K, having upwardly-projecting arms 3, and situated below these arms are the springs L, which serve to normally hold the collars and the arms upward in the position illustrated in Fig. 1. Supported by the arms 3 is a spring-actuated ring 2, the springs 7 thereof tending to hold the ring to its seat in the mouth-ring 8, as illustrated also in Fig. 1.

Each of the tables 13 also carries a neck-ring 8, made in two parts and hinged at their inner sides to a supporting pin or standard M, the neck-ring being thus supported immediately below the mouths of the press-molds, as illustrated.

Supported upon the base A at the "charge-and-press" position, Fig. 3, is a cylinder 35, carrying a piston-rod 40, which has its upper end projecting through the upper end of the cylinder and carrying at its lower end a piston N. Situated below the cylinder 35 is a valve socket or chamber 29, which receives an endwise-moving valve P, and communicating with this valve-chamber is a pressure-supply pipe Q. Forming communication between the upper and lower ends of the cylinder 35 and the valve socket or chamber 29 are the pipes R, the said valves being adapted to admit air alternately to opposite ends of the cylinder for the purpose of reciprocating the piston N, and consequently the piston-rod 40, within the said cylinder for a purpose to be presently described.

The plungers 1 have their lower ends loosely resting in the seat T of the rotating table 26, whereby they are adapted to be lifted from the said table by the upper ends of the piston-rods 40. The lower ends of these plungers 1 are provided with sockets or openings *a*, registering with the openings *b* in the table 26, so that the piston-rod 40 will move up through the openings *b* in the table and the upper end thereof engage in the sockets or openings *a* of the plungers 1 and carry them within the press-molds, as illustrated in Fig. 1.

The table 26 is revolved through the medium of a gear-wheel 27, surrounding the column 24, the said gear-wheel being attached to the base-plates 14 and supported by the depending arms 28, whereby when the table or collar 23 is rotated around the column the gear-wheel 27 is correspondingly rotated. The gear-wheel 27 meshes with studs or projections 42, situated under the table 26, whereby the table is rotated one step at a time to bring successively the plungers 1 under the press-molds and the openings *b* in alinement with the piston-rod 40 of the cylinder 35. It will be readily understood that instead of using four sets of molds to rotate around the column, as illustrated in Figs. 3 and 4, five sets of molds could be used, and in this event it would be necessary to provide the gear-wheel 27 with the proper number of teeth, as illustrated in Fig. 5, to cause the plunger-support to revolve in unison therewith and to carry the plungers in rotation under the molds for pressing the glass into a blank. A valve-rod 30 regulates and controls the admission of pressure to opposite ends of the cylinder 18, the said valve-rod being normally held downward by means of a spring *c*, and situated adjacent the lower end of the said valve-rod is a spring-actuated finger 43, adapted to move under the rod and hold the valve normally in the position shown in Fig. 2, so that air or pressure is being normally admitted to the lower end of the cylinder for normally holding the piston-rod and the press-mold bottom 17 in an upright position, and whereby the bottom will retract under the pressure of the plunger after the mold is full and permit the plunger to always travel the same distance, and thus produce blanks with uniform bottoms, which produces when blown bottles with even and perfectly-formed bottoms. Carried by the plates 14 is an arm 31, adapted to strike the finger or plate 43 and move it from under the lower end of the valve-rod 30, thus permitting it to drop and to cause the air to be admitted to the upper end of the cylinder 18.

When the machine has been placed in position to be started by the setting of the valve 30 through the medium of the treadle 32, (which will be fully explained hereinafter,) the arm 31 serves to make the machine automatic in its operation in that when the machine is brought to the pressing position the said rod automatically trips the valve-rod 30 and admits air to the upper end of the cylinder 18 for carrying the bottom 17 to position, and by the pressing operation the bottom is automatically withdrawn in a manner to be fully described hereinafter.

A lever 34 is intermediately pivoted to an arm *f*, projecting from the bracket C, one end of the lever being connected with the upper end of the valve-rod 30 through the medium of a link 35', and the opposite end of the lever is pivotally connected with the upper end of the rod or strap 33, which passes through the column 24. The lower end of this rod or strap 33 is connected with the treadle 32 at a point intermediate its ends, the opposite end of the treadle 32 being pivotally supported by an arm *g*, depending from the base A.

Connected to the upper end of the piston-rod 19 is an arm 20, which has its opposite and free end provided with an opening through which the upper end of a rod 22 freely passes, the lower end of the rod being connected with a valve *h*, situated within the valve-chamber 29, a spring *i* serving to hold the valve normally upward. Attached to the upper end of the rod 22 is a stop 36, with which the free end of the arm 20 is adapted to engage when drawn downward by the piston-rod 19 in a manner and for a purpose to be described hereinafter. The rod 20 is also provided with a spring-actuated pin 41, which is adapted to engage a notch *e* in the lower end of an arm 21, which is pivotally connected at its lower end to the lever 34 at a point between its fulcrum and the upper end of the valve-rod 30, the function and operation of which will be presently set forth.

The arm 20 is connected with the upper end of the piston-rod 19 by means of a collar *k*, and this collar is also provided with another arm *j*, which arm is adapted to raise and lower a blow-head $t$. This blow-head $t$ has a tube $l'$ extending upward therefrom and carrying a stop $n$ at its upper end, the arm $j$ having an opening $m$, through which the tube $l'$ passes, as clearly illustrated. The blow-head $t$ is provided with a valve $r$, which is so constructed and adapted to admit air to the blow-mold when the blow-head is seated thereon and to cut the air off when the blow-head is lifted from its seat by the upward movement of the piston-rod 19, all of which is fully understood by those skilled in the art and which does not therefore need any further description in this connection, it forming no part of our present invention.

The operation of our machine is as follows: The table 13 is in the position shown in Figs. 1 and 2—that is to say, with the molds upside down. The table is then at the position marked "charge and press," Fig. 3, and the glass is placed in the open bottom of the press-mold. In the starting of the machine the valve 30 is set in the position illustrated in Fig. 2 through the medium of the treadle 31, which admits air to the lower end of the cylinder, thus elevating the bottom 17, and when the valve 30 is released by the rod 31 it causes the valve 30 to admit air above the piston 45, and as the piston-rod 19 moves downward the free end of the arm 20 strikes the knocker or stop 36 of the rod 22, thus depressing the valve $h$, which in its depressed position admits air to the bottom of the cylinder 35, which forces the piston-rod 40 up through one of the openings $b$ of the table 26 and engages one of the plungers 1 and carries it within the press-mold, as indicated in Fig. 1. The bottom 17 being in its lowest position when the free end of the arm 20 strikes the knocker 36 and the plunger serving to displace a part of the glass charged in the press-mold forces the bottom 17 slightly upward. When the bottom 17 has reached its lowest position within the press-mold, the spring-pin 41 of the arm 20 engages the notch $e$ of the link 21, and when the bottom is forced upward, owing to the insertion of the plunger 1 and the forcing upward of the glass charge, the lever 34 has its outer end moved upward sufficiently to move the valve-rod 30 for admitting air below the piston 25, which carries the piston 25 upward and removes the bottom 17 from the press-mold. The upward movement of the piston-rod 19 releases the valve $h$ through the medium of the arm 20 and knocker 36, and the valve is moved upward by the spring $i$ and admits air to the top of the cylinder 35, thus carrying the plunger downward to its position upon the table 26 and the piston-rod out of engagement with the table. The table or collar 23, surrounding the column 24, is turned to carry the press-mold, with its pressed blank, to the "reversing" position of Fig. 3. The molds are then reversed by revolving the table 13, which carries them, first releasing the table by means of the rod 12 and handle 11, as before described. When the molds are reversed, the two parts of the press-mold drop downward into the position shown in Fig. 2 and the blow-mold is closed around the blank, the blank being supported by the neck-ring 8. The pressed blank inclosed within the blow-mold is then carried to the "blowing" position, Fig. 3, and is there blown to the finished form, as is well understood by those skilled in the art. The pressed blank being blown to the finished form, it is then carried while in the blow-mold to the "discharging" position, Fig. 3, where it is removed and the molds placed in the reversed position by revolving the table 13 ready to be again charged when it reaches the charge-and-press position, Fig. 3.

It will be understood that when the pressed blank is carried from the charge-and-press position to the reversing position the molds which were in the discharging position are carried to the charge-and-press position to be charged and pressed, and as the blow-head $t$ is connected with the piston-rod 19, to which the bottom 17 of the press-mold is also connected, the blow-head is moved downward each time the bottom is, so that each time a blank is being pressed a pressed blank is being blown. The operations are repeated, so that in effect when the table 23 has made one revolution a finished article is discharged at the discharging position at each movement of the molds from one position to the succeeding position.

While we have shown the table 23 provided with four sets of molds, it will be readily understood that it may be provided with two or more sets of molds and that the molds could be reversed and blown and discharged at the reversing position or the molds could be subjected to the blowing and discharging operations at the blowing position, so that while we prefer to use the charge-and-press, the reversing, the blowing, and the discharging positions all of these positions are not absolutely necessary and could be omitted without departing from the spirit and scope of our invention.

While the tables 13, which carry the press and blow molds, are rotatable, it will be noted that they only necessarily move half-way around to accomplish the reversing of the molds, so that the table may be merely oscillating instead of rotating and accomplish the same function. It will also be noted from Fig. 1 that when the plunger is carried to its position within the press-mold the arms 3 abut against the two parts of the press-mold, thus holding them firmly in their proper position during the pressing operation, and that when the plunger is lowered the arms 3 release the two parts of the press-mold, so that they will fall apart when the table 13 is turned to reverse the position thereof.

Having thus described our invention, what we claim, and desire to secure by Letters Patent, is—

1. A machine of the character described comprising reversible press and blow molds, non-reversible pressing and blowing mechanisms constructed and arranged to press a blank when the molds are downward and to blow the blank when the molds are upward.

2. A machine of the character described comprising reversible press and blow molds, a relatively stationary pressing mechanism situated at one end of the molds, and a relatively stationary blowing mechanism situated at the opposite end of the molds, the pressing and blowing mechanisms adapted to coöperate with the molds in their reversed positions.

3. A machine of the character described comprising a reversible press-mold, and a reversible blow-mold, a pressing mechanism situated at one end of the molds and adapted to coöperate through the mouth of the press-mold, and a blowing mechanism situated at the opposite ends of the molds and adapted to operate through the mouth of the blow-mold when reversed.

4. A machine of the character described comprising a reversible press and blow mold carrier, a press and blow mold carried and supported thereby, independently-movable pressing and blowing mechanisms adapted to coöperate with the said molds respectively, and a blank-support independent of and relatively stationary in respect to the pressing and blowing mechanisms.

5. A machine of the character described comprising a press-mold open at both ends, a movable bottom adapted to coact with one end and a plunger to coact through the opposite end, an actuating member for said bottom, a controller for said actuating member, the controller adapted to be moved through the movements of the bottom, the plunger adapted to cause the glass charge in the mold to force the bottom slightly outward when the plunger is moved therein, whereby the controller for the bottom is actuated when the plunger enters the mold and the bottom withdrawn.

6. A machine of the character described comprising a press-mold having open ends, a movable bottom adapted to coöperate with one end, a movable plunger adapted to coöperate through the opposite end for forming a pressed blank, a cylinder carrying a piston connected with the movable bottom, a pressure-supply having communication with opposite ends of the cylinder, a controller for the pressure-supply, an operating connection between the controller and the said bottom, whereby the forcing of the plunger in the glass charge partially retracts the movable bottom thus actuating the said supply-controller and causing the withdrawal of the movable bottom.

7. A machine of the character described comprising a press-mold having open ends, a movable bottom adapted to coöperate with one end, a movable plunger adapted to coöperate through the opposite end for forming a pressed blank, actuating members for the said bottoms and plunger, controllers for the actuating members, said controllers operatively connected with the movable bottom, whereby the movement of the plunger in the glass charge will partially retract the movable bottom and actuate said controllers and cause the withdrawal of the plunger and the movable bottom.

8. A machine of the character described comprising a press-mold open at both ends, a movable bottom coacting with one end of the press-mold, a movable plunger coacting through the opposite end of the mold to form a pressed blank, actuating members for said bottom and plunger, controllers for said actuating members, operative connections for the controllers constructed and arranged to move the controllers when the plunger has entered the press-mold, and to cause the withdrawal of the plunger and the movable bottom.

9. A machine of the character described comprising a press-mold open at both ends, a movable bottom for one end and a plunger adapted to enter the opposite end for forming a pressed blank, an actuating member for the movable bottom, a controller for said actuating member, and operative connections for the controller constructed and arranged to move the controller when the plunger has entered the said mold and cause the withdrawal of the movable bottom.

10. A machine of the character described comprising a rotatable table or carrier carrying a plurality of transversely-rotatable press and blow mold carriers, press and blow molds supported by said carriers, a plunger-carrier, a plurality of plungers carried thereby, and a mechanism constructed and arranged to deliver the said plungers respectively to and within the press-molds.

11. A machine of the character described comprising a table or carrier carrying a plurality of reversing press and blow mold carriers, press and blow molds carried thereby a rotating plunger-carrier carrying a plurality of plungers adapted to register with the press-molds, an operative connection between the said rotating carriers, whereby the plunger-carrier is rotated through the rotation of the mold-carrier.

12. A machine of the character described comprising a reversing press and blow mold carrier, a vertically-opening press-mold and a horizontally-opening blow-mold carried by said reversing-carrier and adapted to close over a common point, and a plunger and a blow-head adapted to coöperate with the press and blow molds at opposite ends thereof.

13. A machine of the character described comprising a press-mold having open ends, a movable bottom adapted to coöperate with one end of the mold and a plunger adapted to operate through the opposite end to form a pressed blank, an actuating member for said movable bottom, a controller for said member, a supporting member for said controller holding it normally in position to hold the bottom withdrawn a movable carrier for the press-mold, the movable carrier having a member adapted to operate the support for the said controller and permit it to move in the opposite direction to force the bottom into the mold.

14. A machine of the character described comprising a horizontally-rotating mold-carrier, a plurality of reversing press and blow molds carried in pairs thereby, movable bottoms for said press-mold, and a blow-head connected with said movable bottom at a point to register with the blow-molds of one of the pairs of molds with which said bottom is not coöperating.

15. A machine of the character described comprising a rotatable mold-carrier, a plurality of reversible press and blow molds carried thereby, a movable bottom for the press-molds situated at one end of the molds and a blow-head situated at the same end of the molds and connected with the movable bottom at a distance equal to the distance apart of the sets of molds, whereby the blow-head simultaneously coacts with the blow-mold while the bottom is coacting with a press-mold.

16. A machine of the character described comprising reversible press and blow molds, a removable bottom for the press-mold at one end thereof, a movable plunger situated at and adapted to coact with the opposite end of the press-mold, actuating members for the plunger and the bottom, controllers for the said actuating members, operative connections between said controllers and the movable bottom, whereby the movement of the bottom actuates the controllers and causes the plunger and the bottom to be moved in opposite directions respectively.

17. A machine of the character described comprising a mold-carrier, a plurality of press and blow molds carried thereby in pairs, a blow-head situated at one end of the mold, a rotatable plunger-carrier situated at the opposite end of the said molds, a plurality of plungers supported by but independent of the said carrier, an actuating member for said plungers adapted to carry them away from said plunger-carrier and within the press-molds.

18. A machine of the character described comprising a press-mold having open ends, a movable bottom adapted to coöperate with one end, a rotatable plunger-carrier carrying a plurality of plungers adapted to coöperate with the opposite end of the press-mold, a rotatable carrier for said molds, a gear meshing with the plunger-carrier and a connection between the gear and the mold rotatable carrier, whereby when the mold-carrier is rotated the plunger-carrier is correspondingly rotated.

19. A machine of the character described comprising a press-mold having open ends, a movable plunger adapted to coöperate with one end and a movable bottom adapted to coöperate with the opposite end, cylinders carrying piston-rods adapted to move the plunger and the bottoms, a pressure-supply in communication with opposite ends of said cylinders valves for and controlling said pressure-supply, the bottom piston carrying an arm constructed to actuate both of said valves when moved and thus control the movement of the plunger and the bottom.

20. A machine of the character described comprising a press-mold having open ends, a movable bottom adapted to coöperate with one end and a movable plunger adapted to coöperate with the opposite end, cylinders carrying piston-rods connected respectively with the plunger and the bottom, pressure-supply in communication with the opposite ends of the cylinders, valves for and controlling said pressure-supply, a treadle, a connection between the treadle and the cylinder controlling the movable bottom, the piston-rod of the movable bottom operatively connected with the valves for controlling the pressure-supply to the plunger-controlling cylinder.

21. A machine of the character described comprising a press-mold having open ends, a movable bottom coacting with one end and a movable plunger coacting with the opposite end, cylinders for said bottom and plunger, piston-rods carried by the cylinders for actuating said plunger and bottom, pressure-supply in communication with opposite ends of said cylinders, valves controlling said pressure-supplies, a lever 34 connected with the valve of the bottom-controlling cylinder at one end, a treadle connected with the opposite end of the lever, a rod carried by the bottom-controlling piston, a rod extending from the valve-controlling supply to the plunger-cylinder, said rod carrying a stop adapted to be engaged by the arm of the bottom-controlling piston, said arm carrying a movable member adapted to engage and disengage the said lever 34.

22. In a machine for the manufacture of narrow-neck, pressed and blown glassware, the combination of an inverted narrow-neck press-mold having open ends, a combined removable and pressure-held retractable bottom for said press-mold and of a diameter equal to the interior diameter of the bottom of said mold, and a separate blow-mold.

23. A narrow-neck press-mold for the manufacture of pressed and blown glassware having a pressure-held retractable bottom of a diameter equal to the diameter of the interior of the bottom end of said mold, in combination with a plunger adapted to enter the body of the mold through the neck thereof.

24. In a machine for the manufacture of narrow-neck pressed and blown glassware, the combination of a narrow-neck press-mold having a bottom retractable under pressure caused by a plunger, a slender plunger movable through the narrow neck of said mold into the body thereof, and a blow-mold.

25. A press-mold for the manufacture of glassware having an open end and composed of a plurality of movable portions having separate pivots for each part thereof, and a longitudinally-movable bottom for said mold.

26. A press-mold for the manufacture of glassware having an open end and composed of a plurality of longitudinally-movable parts provided with a transversely-arranged separate pivot for each part located at and to opposite sides of said open end.

27. A machine of the character described comprising a press-mold open at both ends, a movable bottom adapted to coact with one end thereof and a plunger to coact through the opposite end, an actuating member for said bottom, the plunger adapted to cause the glass charged in the mold to force the bottom slightly outward when the plunger is moved therein, and a blow-mold, whereby narrow-neck bottles with uniformly and evenly formed bottoms are produced when the pressed blank is blown to the finished article.

28. A narrow-neck press-mold for the manufacture of glassware having a pressure-held bottom retractable under the pressure of the plunger, said bottom being of a diameter equal to the diameter of the interior of the bottom end of said press-mold and having a concaved inner end the edge of the concave gradually coinciding with the interior wall of the mold.

29. A narrow-neck press-mold for the manufacture of glassware, having a bottom retractable under pressure caused by the movement therein of a plunger, in combination with a plunger adapted to enter the body of the mold through the neck thereof.

In testimony whereof we have hereunto set our hands in the presence of the subscribing witnesses.

CHARLES E. BLUE.
WILLIAM B. JONES.

Witnesses:
W. V. HOGE, Jr.,
A. M. CALDWELL.